(12) United States Patent
Müller

(10) Patent No.: US 9,721,404 B2
(45) Date of Patent: Aug. 1, 2017

(54) APPARATUS FOR A SECURITY SYSTEM OF A VEHICLE

(71) Applicant: Huf Hülsbeck & Fürst GmbH & Co. KG, Velbert (DE)

(72) Inventor: Ulrich Müller, Velbert (DE)

(73) Assignee: Huf Hülsbeck & Fürst GmbH & Co. KG, Velbert (DE)

( * ) Notice: Subject to any disclaimer, the term of this patent is extended or adjusted under 35 U.S.C. 154(b) by 0 days.

(21) Appl. No.: 14/964,597

(22) Filed: Dec. 10, 2015

(65) Prior Publication Data

US 2016/0171803 A1 Jun. 16, 2016

(30) Foreign Application Priority Data

Dec. 10, 2014 (DE) .................. 10 2014 118 343

(51) Int. Cl.
*B60R 25/24* (2013.01)
*G07C 9/00* (2006.01)
*B60L 11/18* (2006.01)
*B60R 25/20* (2013.01)

(52) U.S. Cl.
CPC ........ *G07C 9/00007* (2013.01); *B60L 11/182* (2013.01); *B60R 25/2072* (2013.01); *G07C 2009/00769* (2013.01)

(58) Field of Classification Search
CPC ....................................... B60R 25/24
USPC ........................... 340/5.6, 5.61, 5.72
See application file for complete search history.

(56) References Cited

U.S. PATENT DOCUMENTS

| 2008/0068128 A1* | 3/2008 | Ghabra | B60R 25/245 340/5.61 |
| 2012/0153894 A1* | 6/2012 | Widmer | H04B 5/0037 320/108 |
| 2015/0360577 A1* | 12/2015 | Greenwood | H02J 7/025 320/108 |
| 2016/0294216 A1* | 10/2016 | Barbul | B60L 11/182 |

FOREIGN PATENT DOCUMENTS

| DE | 102013016887 | 6/2014 |
| WO | WO 2012/082858 | 6/2012 |
| WO | WO 2014/141661 | 9/2014 |

OTHER PUBLICATIONS

Europaeischer Recherchenbericht und die Stellungnahme zur Europaeischen Recherche [European Search Report and the European Search Opinion] Dated Jun. 17, 2016 From the European Patent Office Re. Application No. 15198607.2 and Its Translation of Search Report Into English.

* cited by examiner

*Primary Examiner* — Kevin Kim

(57) ABSTRACT

The invention relates to an apparatus (10) for a security system of a vehicle (1), in particular for a keyless activation of a locking mechanism of the vehicle (1), having a communication device (20) for communication with a mobile identification transmitter (100) by means of a radio signal (F) with a radio frequency (F.1), wherein an inductive charging process (L) can be carried out in the region of the vehicle (1) with a charging frequency (L.1), in particular for electrically charging an energy storage device.
According to the invention the radio frequency (F.1) differs from the charging frequency (L.1) such that an interference in the communication with the mobile identification transmitter (100) can be prevented.

19 Claims, 7 Drawing Sheets

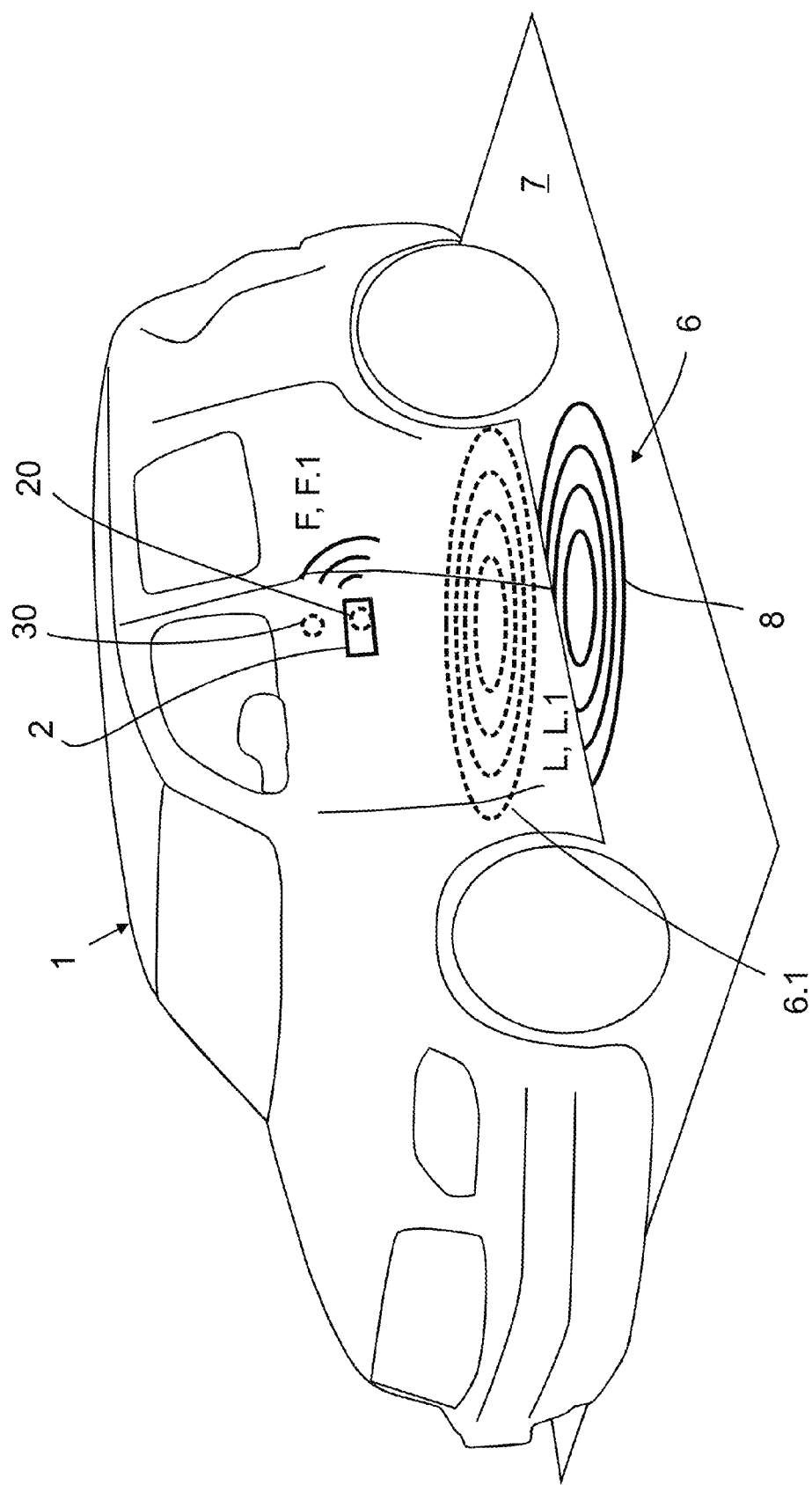

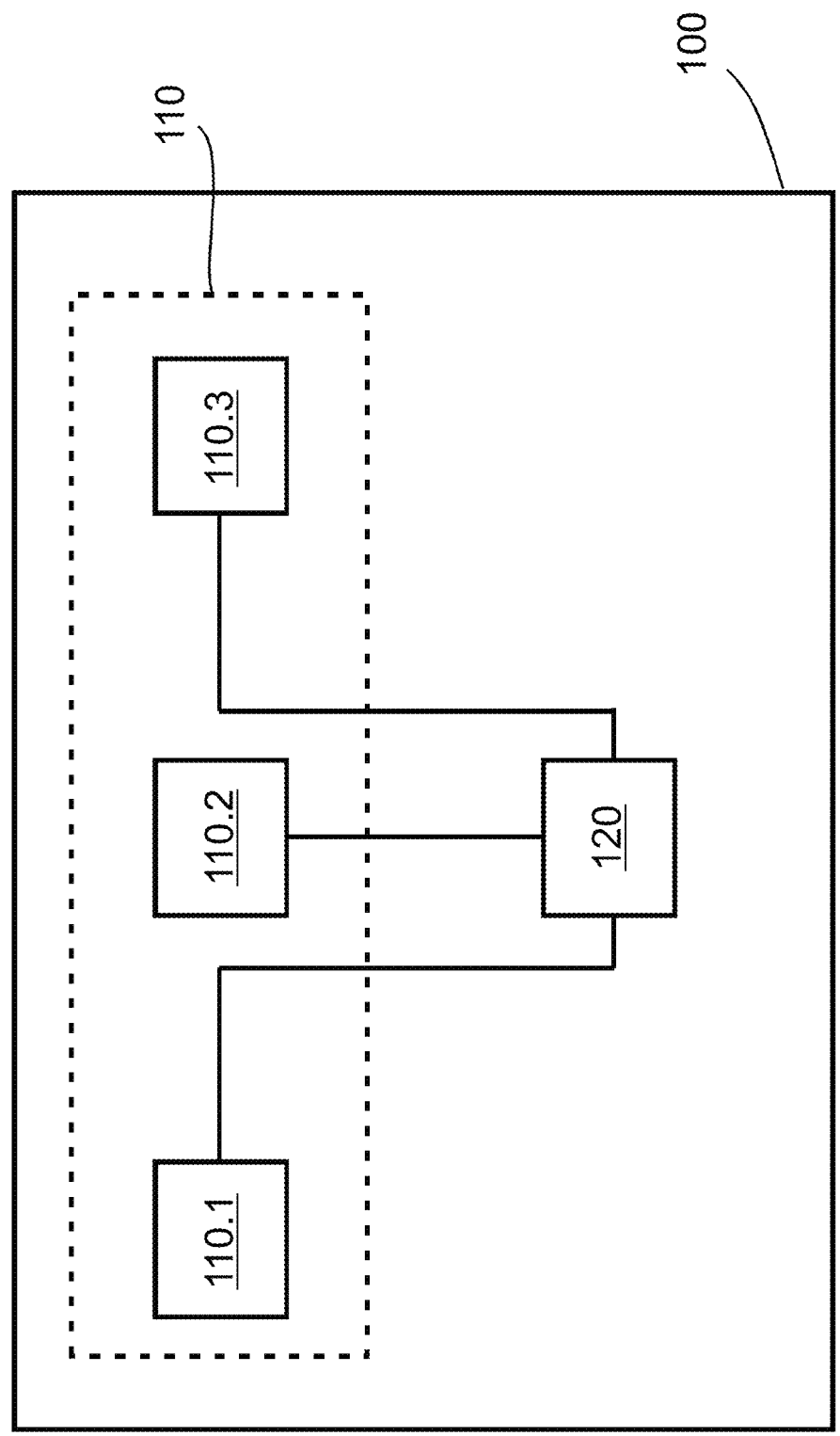

APPARATUS FOR A SECURITY SYSTEM OF A VEHICLE

RELATED APPLICATION

This application claims the benefit of priority of German Patent Application No. 10 2014 118 343.6 filed Dec. 10, 2014, the contents of which are incorporated herein by reference in their entirety.

FIELD AND BACKGROUND OF THE INVENTION

The invention relates to an apparatus for a security system in accordance with the kind defined in more detail in the preamble of Claim 1. The invention also relates to a mobile identification transmitter according to Claim 9, a method according to Claim 11, a security system in accordance with Claim 16 and a vehicle in accordance with Claim 18.

It is known from the prior art that mobile identification transmitters are used for communication with a vehicle, in particular a motor vehicle, for example to effect a keyless activation of a locking mechanism of the vehicle (e.g. for opening the doors). Thereby, the mobile identification transmitter (ID transmitter) is used for authentication with the vehicle, wherein for example a locking mechanism of the vehicle is released only in the event of a positive authentication. In the context of the authentication process, for example authentication data (e.g. with a security code) are transmitted by the ID transmitter over a wireless link to a security system of the vehicle. There is also an increasing market penetration of electronic security systems for locking devices of vehicles, which have e.g. a "passive keyless entry" or "keyless go" functionality. In contrast to conventional security systems, such passive access systems do not require active operation of the mobile ID transmitter (such as the actuation of a button in the ID transmitter) by an operator to perform locking and unlocking. In order also to initiate an authentication query without active operation, a wake-up signal is sent to the ID transmitter, for example by the vehicle or the security system, over a wireless link. This wake-up signal, which is in particular an initialization signal, is detected by the external ID transmitter outside the vehicle, whereupon the latter then carries out an identification check with the vehicle over an (additional) wireless or communication link. For the communication between the vehicle and the ID transmitter, and in particular for transferring the wake-up signal, it is usual to use e.g. an LF wireless connection (Low-Frequency Radio Connection) for example with a frequency of essentially 125 kHz.

It has proved to be a disadvantage that the functionality and reliability of the security system, and in particular of the communication between the vehicle (or security system) and the ID transmitter over a radio link can be severely impaired due to effects such as interference frequencies.

If, for example, an inductive charging process takes place simultaneously to the communication, either of the vehicle or of a vehicle located nearby, then the communication between the security system and the mobile ID transmitter is seriously disrupted due to frequency superposition with the charging frequency, so that a reliable keyless activation of the vehicle locking mechanism by the operator is not feasible. This can then result in, for example, a faulty transmission, or the transmission of the radio signal over the radio link may be completely inhibited.

SUMMARY OF THE INVENTION

It is an object of the present invention therefore to at least partially eliminate the disadvantages described above. In particular, it is the object of the present invention to ensure a reliable, convenient, secure and functionally capable operation of the security system, in particular of the access system and the communication between the security system and the mobile ID transmitter.

The above task is solved by an apparatus having the features of Claim 1, a mobile identification transmitter having the features of Claim 9, a method having the features of Claim 11, a security system having the features of Claim 16 and by a vehicle having the features of Claim 18.

Other features and details of the invention emerge from the respective dependent claims, the description and drawings. Features and details that are described in connection with the apparatus according to the invention are also valid, of course, in connection with the mobile identification transmitter according to the invention, the method according to the invention, the security system according to the invention and the vehicle according to the invention, and vice versa in each case, so that with regard to the disclosure, reference is or can always be made reciprocally to the individual aspects of the invention.

The apparatus according to the invention is designed for use in a security system of a vehicle. In the following the term "vehicle" naturally also refers to motor vehicles, electric vehicles, motorcycles and/or electric motor vehicles. In this context the security system is designed in particular as a passive access system of the vehicle, and in particular serves to provide keyless activation of a locking mechanism of the vehicle. As a passive access system, the security system is particularly suitable for carrying out an authentication query in the event of the proximity of an authorized operator (who is carrying a mobile identification transmitter) automatically, i.e. without active manual operation of the identification transmitter by the operator.

The apparatus according to the invention has a communication device for communication with the mobile identification transmitter (ID transmitter) by means of a radio signal with or at a radio frequency, in particular a first radio frequency. An inductive charging process can be carried out in the region of the vehicle with or at, a charging frequency, in particular for electrically charging an energy storage device. In particular, the energy storage device is an internal energy storage device of the vehicle and/or an external energy storage device and/or an external energy accumulator of a further vehicle such as one located nearby, which can be recharged by the inductive charging process at the charging frequency. Neither the vehicle-internal nor the external energy storage device are part of the apparatus according to the invention.

According to the invention, the radio frequency, in particular the first radio frequency, differs from the charging frequency in such a manner that an interference or any interference in the communication with the mobile identification transmitter can be prevented. This results in the advantage that the viability of the functioning of the security system, in particular the access system, is guaranteed. In particular, a keyless activation of the locking mechanism of the vehicle can therefore be reliably effected by the operator (that is, a person with the ID-transmitter) at all times, which enables the security and convenience to be increased significantly. Because the mobile ID-transmitter according to the invention is used in particular for contactless authentication against the security system, the apparatus according to the invention can facilitate a secure and reliable authentication on the vehicle. This allows the mobile identification transmitter to be designed as e.g. a mobile, portable communication device such as a mobile wireless device, a mobile phone, a smartphone and/or a laptop. The charging process mentioned is preferably effected by an inductive transmission of energy to recharge the energy storage device, in particular, a rechargeable battery of the vehicle and/or of a further vehicle, by means of an (on-board or external) charging device. The energy storage device is preferably used for operating an electric drive, such as an electric motor of the vehicle. It is, for example, the electric drive (either alone or in conjunction with an internal combustion engine) that facilitates the propulsion and/or the locomotion of the vehicle. This means that the expression 'electric vehicle' can also refer to a so-called hybrid vehicle, which has both an electric drive as well as a conventional drive.

It is also conceivable that, to carry out the inductive charging process, the charging device has e.g. charging units (such as induction coils), wherein electromagnetic fields (e.g. magnetic fields or electromagnetic waves) are generated and radiated during the operation of the charging device. This allows interference signals (e.g. electromagnetic waves) to occur at the charging frequency. These interference signals can cause a frequency superposition with the radio signal if the radio frequency is within range of a charging frequency. The relevant charging frequency range is determined by the charging process (e.g. by resonance frequencies of the charging device) and comprises at least one charging frequency. In particular, the frequency superposition completely or at least partially interferes with communication over the radio frequencies in the charging frequency range. To avoid the frequency superposition with the radio frequency of the radio signal of the communication device, the radio frequency, in particular the first radio frequency, therefore differs significantly (e.g. greater than 25%, preferably greater than 50%) from the charging frequency. Alternatively, or in addition, in order to prevent the interference it may be provided that a broadband communication method (ultra-wideband method/UWB method) is used. For this purpose, the radio frequency, in particular the first radio frequency, can differ from the charging frequency in that it is used for communication with the broad communication method. This enables a reliable communication from the radio signal to the ID transmitter to take place. The radio signal can for example comprise data and, in particular, initialization and/or authentication data, which are transmitted over a radio link to the ID transmitter at the radio frequency.

Advantageously, within the scope of the invention it can be provided that the communication device has a first communication unit for transmitting the radio signal at a first radio frequency, in particular clearly outside a charging frequency range, and a second communication unit for transmitting the radio signal at a second radio frequency, in particular within the charging frequency range. The first radio frequency differs from the charging frequency in such a manner that a disruption or an interference in the communication with the mobile identification transmitter (due to interference signals) can be prevented. In particular during an (activated) charging process, a first communication unit can therefore be used for communicating with the mobile identification transmitter, in order to prevent a frequency superposition with the charging frequency and thus to ensure a reliable communication. At the same time, in particular when a charging process is deactivated, it is possible to use a second communication unit to communicate with the mobile identification transmitter. This also provides the advantage that the charging frequency range can also be used to communicate with the mobile identification transmitter when charging is deactivated. The charging frequency used in particular lies substantially in the range 90 KHz to 130 kHz. This frequency range can have other advantages for communication with the mobile identification transmitter using the radio signal, e.g. for transmitting a wake-up signal. Thus, for example, the wake-up signal, which is transmitted in the LF frequency range, can also be used for locating the position of the ID-transmitter and/or determining whether the ID-transmitter is located inside or outside the vehicle. This is based on the fact that the LF-radio signal can be subject to shielding, in particular due to the vehicle body. It is possible, e.g. by means of an analysis device (such as a microcontroller) or electronics belonging to the security system or the vehicle, to use the localization in order, for example, to prevent the locking of the vehicle if the ID transmitter is located inside the vehicle. Likewise, the engine can be prevented from starting in order to increase security when the ID-transmitter is located, e.g., outside the car. To achieve this, the second radio frequency for transmission of the radio signal, and in particular the wake-up signal, can be in the range of 125 kHz.

It is optionally provided that the radio frequency, in particular the first radio frequency, differs from the charging frequency in that it is used for communication with a broadband communication method, such as UWB (ultra wide band or Ultra Wideband Technology). Accordingly it is conceivable that the radio frequency does not (only) differ from the charging frequency in its frequency but (also) e.g. in its (interference-resistant) usage. This means it is possible, in particular, for the communication device to have a first and/or additional communication unit (for example, in the form of a UWB transmitter and/or receiver) for transmitting the radio signal at one or more first radio frequencies, in particular at least partially clearly outside of a charging frequency range and/or in a UWB frequency range. For this purpose the first or additional communication unit comprises e.g. a communication interface for the broadband communication method, in particular a UWB communication interface, which is designed e.g. to communicate using UWB. In this case the radio signal is, for example, a UWB signal. If appropriate, the communication device additionally has a second communication unit for transmitting the radio signal with at least one second radio frequency, in particular within the charging frequency range. At least one or all of the first radio frequencies differs from the charging frequency in such a manner that an interference in the communication with the mobile identification transmitter (due to interference signals) can be prevented.

The mobile identification transmitter (ID transmitter) according to the invention preferably has a sending and/or receiving device (e.g. in the form of a UWB receiver and/or transmitter), which is designed to communicate with the communication device (and/or the first or additional communication devices) by means of the radio signal with or at the first radio frequency or frequencies. The transmission of the radio signal (in particular via the first or additional communication unit) can preferably take place at least partially (e.g. in dependence on the charging process) in the form of a UWB communication, in particular to prevent interference with the communication due to the charging process. Thus for example, the radio signal can then be sent via the UWB communication when the charging process is activated. A reliable communication is therefore possible.

It can optionally be provided that the first radio frequency (or frequencies) differ(s) from the charging frequency in that at least one first radio frequency for communicating with the mobile identification transmitter lies in a UWB frequency range. This means it may be possible for the radio signal to be transmitted, in particular, via the communication device and/or the first communication unit or an additional communication unit at least partially at the (first) radio frequency, if appropriate also with different (first) radio frequencies in a UWB frequency range as a UWB communication. This enables interference in the communication to be prevented.

The (UWB) communication using the Ultra Wideband Technology (UWB) is based on the assumption that the channel capacity increases linearly with the bandwidth of the transmitted signal and logarithmically with its power. For example, the available bandwidth for communication technologies such as Bluetooth is narrow and constant. UWB by contrast uses a very wide frequency range to allow a high channel capacity at a reduced transmission power. This has the advantage that a data transfer can take place with very low transmitter power consumption. The maximum output power of a UWB transmitter is, for example, 1 mW.

For data transfer a multiplexing method in particular is used, preferably a frequency multiplexing method such as the Orthogonal Frequency Division Multiplexing (OFDM) method and/or a coded multiplexing method such as the Code Division Multiple Access method, in particular Direct-Sequence-Code Division Multiple Access (DS-CDMA). For data transfer, pulsed signals are preferably transmitted wirelessly. This involves e.g. also shifting the pulses using (pseudo-)random values, wherein for example the UWB transmitter and receiver then take into account the same values to produce the shift. Preferably on or before the data transfer starts, a time synchronization of the transmitter and receiver is performed. To evaluate the received signal the (UWB) sending and/or receiving device comprises, e.g., electronic components such as comparators to compare received pulses, or integrated circuits, and preferably also electronic components for performing a Fast Fourier Transformation.

The data transmission (in particular by UWB) preferably occurs in encrypted form. For this purpose, cryptographic security mechanisms such as RSA, which comprise e.g. connection keys and/or authentication mechanisms and/or the use of secret (private) and public keys and/or a symmetrical and/or asymmetrical cryptographic systems and/or a hybrid encryption. The advantage is therefore achieved that a secure and reliable transmission is possible.

The UWB-communication preferably takes place over at least a large (UWB) frequency range, preferably with a (total) bandwidth of at least 5 GHz and/or at least 2 GHz and/or at least 1 GHz and/or at least 500 MHz and/or of at least 40% and/or at least 30% and/or at least 20% and/or at least 10% of the arithmetic mean value of the lower and upper cut-off frequency of the frequency band used. For example, the frequency range in the range of 0 to 40 GHz, preferably 3.5 GHz to 6.8 GHz, preferably 20 MHz to 11 GHz, and particularly preferably 30 MHz to 10.6 GHz and/or 22.0 GHz to 26.7 GHz and/or 1 MHz to 12.4 GHz can be used. It can be further provided that for the UWB communication the maximum mean value of the spectral power density lies in the range between −90.0 dBm/MHz and −85.0 dBm/MHz. The maximum transmission power is, for example, 1 mW. The data transmission rate is preferably at least 1 Mbit/s or at least 4 Mbit/s or at least 6 Mbit/s, in particular a maximum of 6.8 Mbit/s or 10 Mbit/s. A fast and interference-free transmission is therefore possible.

It is also conceivable that the radio signal, the response signal of the ID-transmitter, the data or authentication credentials of the radio signal and/or the response signal are transmitted in encrypted form. To further increase the security level, if necessary the data may also include test data such as parity bits, error-correction and/or corrective date codes, in order to detect transmission errors and correct them as necessary. It is also possible that a monitoring device is provided for the apparatus according to the invention, for the ID-transmitter according to the invention and/or for the security system according to the invention, which evaluates the received data and detects transfer errors. Thereby, if necessary, it is possible when faults are detected either in the transmission over the radio link or in the radio signal to change the system over as appropriate from the operation of a second communication unit to the operation of a first communication unit, and if necessary vice versa.

A further advantage within the scope of the invention can be achieved if the communication device can be used to control a first or further communication unit or a second communication unit for transmitting the radio signal, in accordance with the charging process. In this manner it can be provided that when a charging process is activated, i.e. during operation of the charging device, the first communication unit is controlled and the radio signal is therefore transmitted at a first radio frequency. In this way, any interference of the radio frequency due to the charging frequency is effectively eliminated. When a charging process is deactivated, in particular the second communication unit can be controlled to broadcast the radio signal at a second radio frequency. In this case, the charging frequency range can again be used to communicate with the ID-transmitter, and so the flexibility and reliability of the communication and authentication can be further increased. The control of the first and/or second communication unit is dependent in particular on the proximity of an object, in particular a person with the ID transmitter. This proximity to the vehicle is detected, for example, by a sensor device with proximity sensors. The changeover action and the evaluation of the charging process and/or the sensor device can be performed by e.g. by a control unit of the communication device. For this purpose the control unit has, for example, an evaluation device, a set of electronics and/or a microprocessor and is in particular electrically connected and/or connectable to the vehicle electronic systems, the sensor device, a monitoring device for monitoring the charging process and/or to the charging device. This enables an effective and reliable control of the communication device.

Advantageously, within the scope of the invention a monitoring device can be provided for monitoring the charging process, wherein the monitoring device enables an activated and/or deactivated charging process to be detected. For example, it may be provided that the monitoring device is electrically and/or mechanically connected and/or is connectable to the charging device and, for example, by transmitting a signal to an evaluation unit of the monitoring device the condition of the charging device (i.e. activated or deactivated) is signalled. In particular, only in the case of an active charging process, i.e., in the case of a charging device in the operating condition, an interference signal is emitted at a charging frequency by the charger and/or a frequency superposition of the charging frequency takes place with the second radio frequency of the radio signal. Only in the case of a deactivated charging process, i.e. when the charging device is in the deactivated (and possibly de-energised) state, can a communication take place between the communication device and the ID-transmitter at a second radio frequency without interference. The monitoring device therefore achieves the advantage that during an active charging process, the (first) radio frequency of the radio signal can be adapted or used in such a manner that interference in the communication with the mobile identification transmitter is prevented, and thus the reliability of the communication and of the vehicle security system is increased.

It is also conceivable that the communication device has a first communication unit with a Bluetooth communication interface and/or an HF communication interface and/or an UWB communication interface, and a second communication unit with an LF communication interface. The LF communication interface is particularly suitable for broadcasting radio signals with a radio frequency substantially in the range of 50 KHz to 300 kHz. The HF communication interface (HF refers to high frequency or shortwave) is particularly suitable for broadcasting a radio signal in the frequency range from 3 to 30 MHz. The UWB communication interface is preferably designed to carry out a UWB communication in a UWB frequency range. Thereby the radio signal and/or a response signal of the ID-transmitter can be broadcast e.g. as an amplitude modulated, code modulated, frequency modulated and/or pulse-width modulated signal for transmission in the UWB and/or LF and/or HF frequency range. The Bluetooth communications interface transmits in particular a radio signal in a frequency range of substantially 2.4 GHz, wherein for example the industry standard IEEE 802.15.1 is used for data transmission or for the transmission of the radio signal. The Bluetooth communications interface can also be designed e.g. according to a Bluetooth low-power or Bluetooth low-energy standard. It is also conceivable that the first communication unit has a GSM (Global System for Mobile Communication), a wireless local area network (WLAN) and/or a NFC (Near Field Communication) communications interface. In this manner, using the first communications interface it is possible to flexibly use a frequency range for the radio signal which differs significantly from the charging frequency and thus ensures a reliable communication. It may be possible for the different communication interfaces of the first communication unit and/or the first communication unit together with the second communication unit to be operated simultaneously or sequentially. For example, in the event of proximity of an object, such as the ID-transmitter or an operator, the first and second communication unit are activated simultaneously or sequentially and the radio signal can therefore be transmitted to the ID transmitter either simultaneously or sequentially, or by means of polling on different frequencies. This achieves the advantage that, even without monitoring of the charging process, interference in particular frequency ranges can be avoided.

According to an advantageous extension it can be provided that the radio frequency, in particular a first radio frequency, is significantly different from the charging frequency, and in particular has a frequency which is higher than the charging frequency by at least a factor of 10, 100 and/or 1000. It can also be provided that a frequency interval of at least e.g. 100 kHz, 1 MHz, 10 MHz, 100 MHz or 1 GHz is provided between the first radio frequency or the radio frequency and the charging frequency. It is also possible that the interval is regulated in an adaptive manner by a controller, for example depending on monitored interference signals. The significant interval with respect to the charging frequency ensures a reliable communication at all times.

Within the scope of the invention it can be advantageously provided that the radio frequency, in particular a first radio frequency, lies in the frequency range from 200 KHz to 10 GHZ, in particular in the frequency range from 3 MHz to 3 GHz and/or the charging frequency is in the charging frequency range from 1 KHz to 500 kHz, in particular 50 KHz to 200 kHz. It is also conceivable that to communicate with the mobile identification transmitter the communication device always uses one radio signal at a radio frequency, wherein the radio frequency lies in the frequency range of 200 kHz to 10 GHZ, in particular in the frequency range from 3 MHz to 3 GHz. The communication device can have e.g. only one first communication unit (i.e. with no other communication units) to communicate in the frequency range described. This enables a transmission of the radio signal which is free of interference by the charging frequency at all times.

It is also conceivable that a sensor device is provided, in particular an optical or capacitive one, for detecting the proximity of an object, in particular of an operator of the mobile identification transmitter, wherein the first communication unit can be controlled by the communication device, in particular (e.g. exclusively), in the event of a positive detection of the proximity and of an activated charging process. In this event, in particular when a charging process is activated and/or when the proximity is detected, the first communication unit is activated to transmit the radio signal and when the charging process is deactivated and/or the proximity is detected, in particular only the second communication unit is activated. The sensor device can comprise e.g. a capacitive sensor, e.g. in the area of the door handle and/or an optical sensor, e.g. in the side region and/or in the rear of the vehicle. It is also possible that the sensor device has at least two, three, four and/or five sensors, for example, on different sides (front, rear, side regions) of the vehicle, in order to enable a reliable detection of the proximity of the object from at least one direction of the vehicle. It can also be provided that the sensor device and/or a control unit is connected, e.g. electronically, to the communication device, in order to detect the proximity of the ID transmitter, for example by an evaluation of a radio link for transmitting the radio signal. One means of doing so is to analyse the signal strength, in order, for example, to measure a distance from the ID transmitter, and/or to detect a presence of the ID transmitter in the receiving range by polling. For example, the radio signal can be emitted cyclically, wherein on receipt by the ID transmitter a response signal is automatically sent to the vehicle, so that the proximity of an object is detected. This method enables a reliable detection of proximity, in order then, for example, to activate a first communication unit or a second communication unit of the communication device, depending on the proximity and the charging process.

The subject matter of the invention also includes a mobile identification transmitter for providing a link, especially a communication link, for a security system of a vehicle, in particular, an electric vehicle, motor vehicle, motorcycle and/or and electric motor vehicle. The security system in this case can be, for example, a passive access system for keyless activation of a locking mechanism of the vehicle. The apparatus has a communication device for communicating with the mobile identification transmitter by means of a radio signal with a radio frequency, wherein an inductive charging process can be carried out in the area of the vehicle with a charging frequency, in particular for electrically charging an energy storage device. The mobile identification transmitter (ID transmitter) according to the invention preferably has a sending and/or receiving device, which is suitable for communicating with the communication device by means of the radio signal at the radio frequency. Here it is intended that the radio frequency differs from the charging frequency such that interference in the communication with the mobile identification transmitter can be prevented. This means that the mobile identification transmitter has the same advantages as those which have been explained in detail with reference to an apparatus according to the invention. In addition, the mobile identification transmitter can be designed to be operated with an apparatus according to the invention.

It is also conceivable that the mobile ID transmitter according to the invention is suitable for receiving signals from the apparatus according to the invention. For this purpose the mobile ID transmitter according to the invention can preferably have a sending and/or receiving device, which has e.g. a first sending and/or receiving unit and/or a second sending and/or receiving unit. The first sending and/or receiving unit can also be suitable for communicating with a first communication unit of the communication device and the second sending and/or receiving unit can be correspondingly suitable for communicating with a second communication unit of the communication device. It is also possible that the communication with the first or second communication unit, and therefore the control of the first or second sending and/or receiving unit, takes place, in particular, in accordance with the charge state of a charging device. The sending and/or receiving device of the mobile ID transmitter can be designed for receiving the radio signal, in particular a wake-up signal, and/or for sending a response signal to the vehicle. The first sending and/or receiving unit preferably has a Bluetooth interface and/or an HF interface and/or a UWB interface and/or an interface which is suitable for communicating with the first communication unit of the communication device according to the invention. It is further conceivable that the second sending and/or receiving unit of the sending and/or receiving device of the ID transmitter has an LF interface and/or an interface which is suitable for communicating with the second communication unit of the communication device. In addition, the mobile ID transmitter according to the invention can have a monitoring unit which is suitable for monitoring frequency ranges and/or for communication with the charging device, and which can thus detect an activated and deactivated charging process. Depending on the charge state, the monitoring unit can control the first sending and/or receiving unit, for example, when the charging process is active, and control the second sending and/or receiving unit of the mobile ID transmitter according to the invention when the charging process is inactive. This enables a reliable communication with the apparatus or the security system at all times.

The invention also comprises a method for operating an apparatus for a security system of a vehicle, in particular a motor vehicle, electric vehicle, motorcycle and/or an electric motor vehicle. The security system used is in particular a passive access system which is used in particular for the keyless activation of a locking mechanism of the vehicle. The apparatus has a communication device for communicating with a mobile identification transmitter by means of a radio signal with or at a radio frequency. In addition, an inductive charging process is carried out with or at a charging frequency in the region of the vehicle, in particular for electrically charging an energy storage device. According to the invention it is provided that the radio frequency differs from the charging frequency such that interference in the communication with the mobile identification transmitter is prevented. The method according to the invention therefore provides the same advantages as those which have been explained in detail with reference to an apparatus according to the invention and with reference to a mobile identification transmitter according to the invention. In addition, an apparatus according to the invention and/or a mobile identification transmitter according to the invention can be used to implement the method according to the invention.

Within the scope of the invention it can also be advantageously provided that the radio signal is a wake-up signal to be received by the mobile identification transmitter, wherein on receiving the wake-up signal the mobile identification transmitter transmits a response signal to the apparatus. The wake-up signal can be transmitted by the communication device with a radio frequency in the LF frequency range, for example, in particular in the region of 125 kHz. To receive the wake-up signal the mobile identification transmitter comprises e.g. a sending and/or receiving unit, which is suitable e. g. for receiving in the LF frequency range. The response signal can be a radio signal in the HF frequency range, for example, which is transmitted by a second sending and/or receiving unit. It is also conceivable that the wake-up signal is received, e.g., via the second sending and/or receiving unit of the mobile ID transmitter. A UWB interface and/or HF interface and/or Bluetooth interface, for example, of the second sending and/or receiving unit can be used for this purpose. This has the advantage that a very convenient and secure authentication and activation of the locking mechanism of the vehicle is possible in different frequency ranges, for example to prevent interference by interference signals.

It is also conceivable that a charging device of the vehicle is operated, in particular only, during the active charging process, wherein in particular, due to the current flowing in a primary charging unit, in particular a charging coil, a voltage is generated in a secondary charging unit, in particular a charging coil, of the charging device, in particular for charging up an energy storage device, such as a rechargeable battery of the vehicle. For example, the charging unit can have a ferromagnetic material such as an iron core and be implemented, for example, as an induction coil, a flat coil, wound coil, solenoid coil, tesla coil and/or transformer coil, to facilitate the most efficient energy transfer. Preferably, the charging device is turned off during a deactivated charging phase and in particular, does not emit any interfering signals and/or electromagnetic waves in the charging frequency range. During the activated charging phase in particular, the charging device emits an interfering signal and/or electromagnetic waves in the region of the charging frequency, and/or in the charging frequency range. The charging device can have, for example, an on-board secondary charging unit, which in combination with the primary charging unit forms e.g. a transformer for recharging the energy storage device or rechargeable battery of the vehicle. The charging process takes place in particular in a contactless manner, (exclusively) by means of inductive energy transfer. The primary charging unit can be arranged or implemented outside the vehicle such that it can be driven over, in such a manner that the vehicle can drive over the primary charging unit and thus can be positioned such that an inductive energy transfer from the primary charging unit to the secondary charging unit is possible. In particular, depending on the operating frequency of this transformer or of the primary and secondary charging units, an electromagnetic field, i.e. in particular a stray magnetic field, is radiated at the charging frequency. This is used for energy transfer, but it also causes interference signals. For this reason, for example, a monitoring device (of the apparatus or the charging device connected to the apparatus) is provided, which in the case of an active charging process causes a radio signal to be emitted with a radio frequency which differs significantly from the charging frequency. This ensures a simple, convenient and contactless charging of the rechargeable battery of the vehicle while still allowing the reliable operation of the security system.

It is also conceivable that the steps listed below for the contactless authentication with the vehicle security system are carried out:
a) transmission of the radio signal, especially with or at a first or second radio frequency, by the communication device,
b) reception of the radio signal by the mobile identification transmitter,
c) transmission of a response signal, in particular with or at a first radio frequency or a second radio frequency or a third radio frequency, in particular with a security code, to the communication device.

In doing so, the radio signal can be transmitted with a first radio frequency during an activated charge state and with a second radio frequency during a disabled charge state. The transmission of the radio signal can be triggered, for example, by means of a sensor, in particular an optical sensor of a sensor device of the apparatus. Thus it is only on the proximity of an object, such as the operator or the ID transmitter, that the radio signal is broadcast. The radio signal can be transmitted over a radio link, for example, wherein the radio link is in particular a bidirectional link and in particular a UWB, an LF, HF and/or Bluetooth link. The radio link can also be used, for example, to exchange authentication data or other vehicle information. The response signal is transmitted over e.g. a first and/or a second and/or a third sending and/or receiving unit of the mobile identification transmitter, wherein the third sending and/or receiving unit has e.g. a UWB interface and/or an HF and/or LF interface and/or a Bluetooth interface. The third radio frequency is for example in the HF and/or LF and/or UWB and/or the Bluetooth frequency range, and in particular in the frequency range from 30 KHz to 300 KHz and/or 3 MHz to 30 MHz and/or 2.4 GHz to 2.485 GHz. In particular, the third sending and/or receiving unit can be used regularly and at all times (independently of the charging process) for the transmission of the response signal. This makes a secure and reliable authentication possible at the vehicle.

The subject matter of the invention also includes a security system, in particular an active or passive access system for a vehicle, in particular for a keyless activation of a locking mechanism of the vehicle. The security system according to the invention has a mobile identification transmitter and an apparatus, wherein the apparatus has a communication device for communicating with the mobile identification transmitter by means of a radio signal with a radio frequency. An inductive charging process can be carried out in the region of the vehicle with a charging frequency, in particular for electrically charging an energy storage device. Here it is intended that the radio frequency differs from the charging frequency such that interference in the communication with the mobile identification transmitter can be prevented. The security system according to the invention therefore provides the same advantages as those which have been explained in detail with reference to an apparatus according to the invention, to a mobile identification transmitter according to the invention and to a method according to the invention. In addition, the security system according to the invention can be designed to be operated with an apparatus according to the invention, with an identification transmitter according to the invention and/or in accordance with a method according to the invention.

Moreover, a vehicle, in particular an electric vehicle, a motor vehicle, motorcycle and/or an electric motor vehicle, also form the subject matter of the invention. The vehicle according to the invention has an apparatus for a vehicle security system, which is in particular suitable for providing a keyless activation of a locking mechanism of the vehicle. The apparatus comprises a communication device for communicating with a mobile identification transmitter by means of a radio signal with a radio frequency. At the same time, an inductive charging process can be carried out in the region of the vehicle with a charging frequency, in particular for electrically charging an energy storage device, wherein the radio frequency differs from the charging frequency in such a manner that an interference of the communication with the mobile identification transmitter can be prevented. The vehicle according to the invention therefore provides the same advantages as those which have been explained in detail with reference to an apparatus according to the invention, a method according to the invention, a mobile identification transmitter according to the invention and a security system according to the invention. The vehicle according to the invention can also be suited to being operated in accordance with a method according to the invention, wherein in particular an apparatus according to the invention, a mobile identification transmitter according to the invention and/or a security system according to the invention are used.

It is also conceivable that a charging device for carrying out an inductive charging process of the vehicle with a charging frequency is provided, wherein in particular the charging device has a secondary charging unit, and in particular, energy can be inductively transferred from a primary charging unit during the charging process. The secondary charging unit in this case is in particular integrated within the vehicle according to the invention, and arranged in particular close to an underground or in the area of the underbody of the vehicle. Thus an operator can very easily and conveniently stop the vehicle above a primary charging unit and therefore bring it into the immediate vicinity of the primary charging unit. This makes it possible to easily carry out a charging process.

BRIEF DESCRIPTION OF THE SEVERAL VIEWS OF THE DRAWINGS

Other benefits, features, and details of the invention emerge from the following description, in which exemplary embodiments of the invention are described in detail by reference to the drawings. The features identified in the claims and in the description can be essential to the invention, either individually or in any desired combination. These show:

FIG. 1 a perspective schematic drawing of parts of an apparatus according to the invention and of a vehicle according to the invention, FIG. 2a a schematic side view of a vehicle according to the invention, FIG. 2b a plan view of the vehicle according to the invention, FIG. 3a+3b a schematic view of parts of an apparatus according to the invention, wherein a deactivated and an activated charging process are shown, FIG. 4a a schematic drawing of a communication device of an apparatus according to the invention in accordance with a first exemplary embodiment, FIG. 4b a schematic drawing of a communication device of an apparatus according to the invention in accordance with another exemplary embodiment, FIG. 5 a schematic drawing of a mobile identification transmitter according to the invention, FIG. 6 a schematic drawing for visualising method steps of a method according to the invention.

Technical features and elements having the same function and mode of operation are in each case labelled with the same reference numeral in the Figures.

DESCRIPTION OF SPECIFIC EMBODIMENTS OF THE INVENTION

Figure 2B:
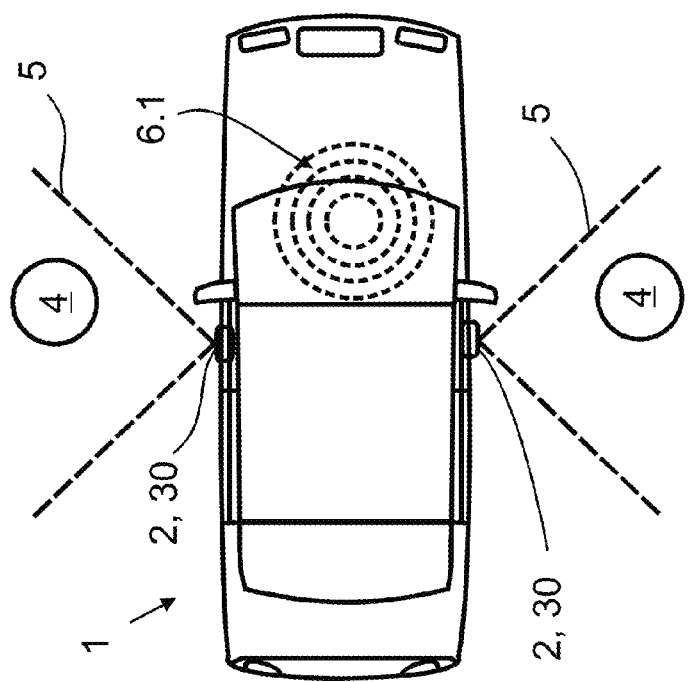

FIG. 1 shows a schematic view of a vehicle 1 according to the invention with parts of an apparatus 10 according to the invention. Here it can be seen that in (or on) the vehicle 1 a communication device 20 is arranged, for example, in the door handle 2, which facilitates a communication with a mobile identification transmitter 100, not shown, by means of a radio link. To effect this, the communication device 20 can broadcast a radio signal F with a radio frequency F.1. If this radio signal F, which is a wake-up signal, for example, is received by the ID transmitter 100, then an authentication process, for example, can be initiated with the vehicle 1 due to the fact that the mobile identification transmitter 100 transmits a response signal over an additional radio link to the vehicle 1. The response signal comprises, for example, authentication data such as a security code, which can be evaluated by a security system on board the vehicle. If the security code matches a pre-defined code, then, for example, the closing mechanism of the vehicle 1 is activated following successful authentication. So that in the event of proximity of the user or the ID transmitter 100 a radio signal F is transmitted for authentication, a sensor device 30 is provided on the vehicle 1, which detects the proximity of objects 4, whereupon it controls the communication device 20 so that the radio signal F is transmitted. The radio Signal F is then broadcast (normally, for example, over an LF-radio link), e.g. by a second communication unit 22 of the communication device 20. For example, the radio signal F can be disrupted by a charging process L, if electromagnetic or magnetic fields in the same frequency range are present in the region of the vehicle 1 and, for example, a frequency superposition takes place. Such an interference signal is generated, for example, by a charging device 6 of the vehicle 1. Thereby the charging device 6 is used in particular for energy transfer and charging an energy storage device of the vehicle 1. To do this, the charging device 6 has a secondary charging unit 6.1, which is arranged on (or in) the vehicle 1. As shown in FIG. 1, the secondary charging unit 6.1 is arranged in the lower area of the vehicle 1, and so can be brought within range of a primary charging unit 8 in a simple manner. The operator of the vehicle 1 can do this by, for example, parking the vehicle 1 immediately above the primary charging unit 8. The primary charging unit 8 can be arranged and/or integrated, for example, in or on a floor 7 that can be driven over, and can therefore also be driven over itself. Since the secondary charging unit 6.1 reaches the vicinity of the primary charging unit 8 and the charging units 6.1, 8 are implemented, for example, as induction coils, electrical energy can be transferred by induction from the primary charging unit 8 to the secondary charging unit 6.1. The electrical energy is then passed on, e.g. from the secondary charging unit 6.1, to other components of the charging device 6 of the vehicle 1, in order to charge up the energy storage device of the vehicle 1. For example, the charging units 8, 6.1 or rather induction coils can have, for example, a ferromagnetic material such as an iron core and be implemented, for example, as a flat coil, wound coil, solenoid coil, tesla coil and/or transformer coil. In this case the charging units can be arranged as flat as possible, or parallel to the underbody of the vehicle 1. Because the charging units 6.1, 8 are operated at a specific charging frequency L.1, which is for example in the range between 90 and 130 kHz, a frequency superposition with the radio signal F is produced if the radio frequency F.1 of the radio signal F lies e.g. in the LF frequency range. For this reason, it is provided according to the invention that the radio frequency F.1 differs from the charging frequency L.1 such that an interference in the communication with the mobile identification transmitter 100 is prevented. In addition to this, for example a first communication unit 21 of the communication device 20 is used, which transmits the radio signal F with a radio frequency F.1 which differs significantly from a charging frequency range L.2 and thereby from the charging frequency L.1. It can also be provided that the communication device 20 only comprises the first communication unit 21, so that in the normal case (when the charging process I is inactive) it also sends the radio signal F via the first communication unit 21. Alternatively, the communication device 20 can use the second communication unit 22 in the normal case and only operate the first communication unit 21 when the charging process II is activated.

Figure 2A:
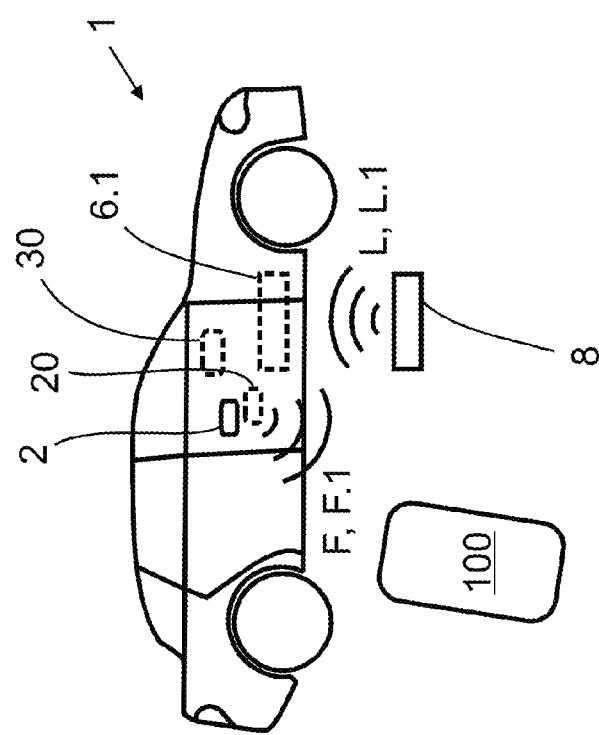

FIGS. 2a and 2b show parts of an apparatus 10 according to the invention, and of a vehicle 1 according to the invention and of a security system according to the invention. A mobile ID transmitter 100 according to the invention can be seen, which is carried by an operator of the vehicle 1, for example. The operator, or the mobile ID transmitter 100, can be detected by means of a sensor device 30 of the vehicle 1 as an object 4 in a detection range 5. In FIGS. 2a and 2b the sensor device 30 is arranged in the side region of the vehicle 1, e.g. in a door handle 2 (e.g. inside the plastic casing of the door handle 2) of a vehicle 1. However, it is also conceivable for the sensor device 30 to be arranged in any desired area of the vehicle 1, e.g. in the boot region, and therefore, for example, the exterior of the vehicle 1 to be fully monitored by the detection range 5. FIG. 2a also shows a secondary charging unit 6.1 in the vehicle 1 and an external primary charging unit 8 outside the vehicle 1, e.g. in a floor 7. A communication device 20 in the vehicle 1 can also be seen, which is connected to the ID transmitter 100 by a radio link. According to a first exemplary embodiment of the apparatus 10 according to the invention, the communication device 20 has only a first communication unit 21, and therefore transmits the radio signal F only at a radio frequency F.1, which is different from the charging frequency L.1.

Figure 3B:
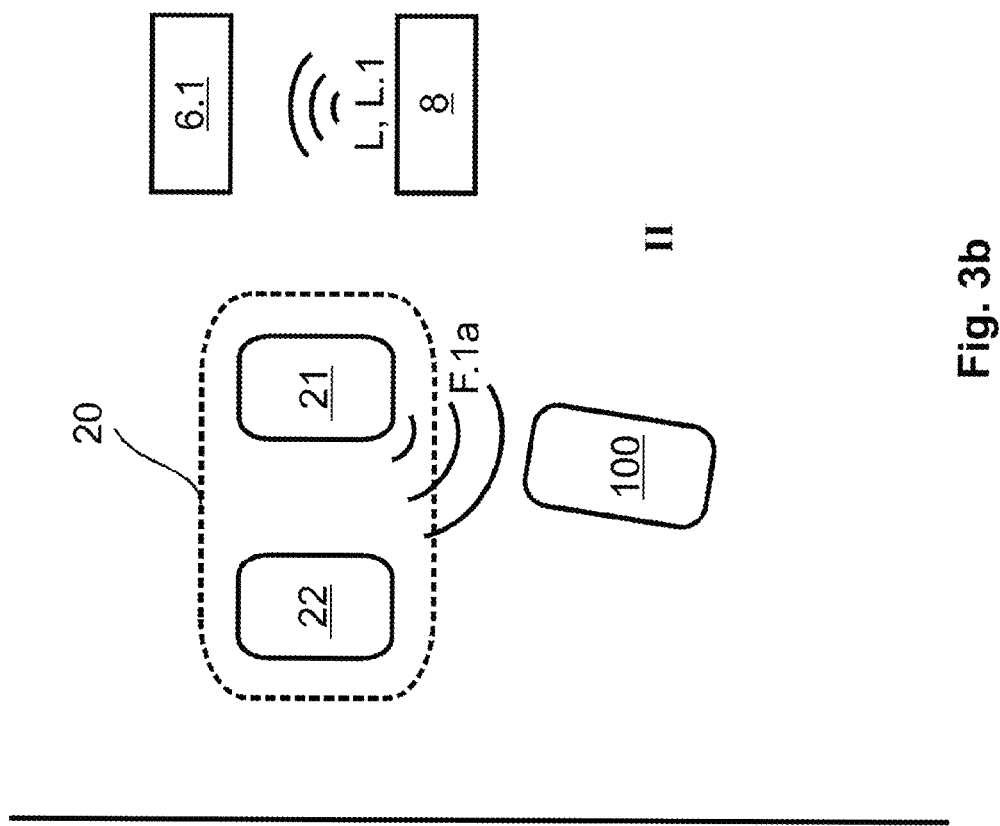
Figure 3A:
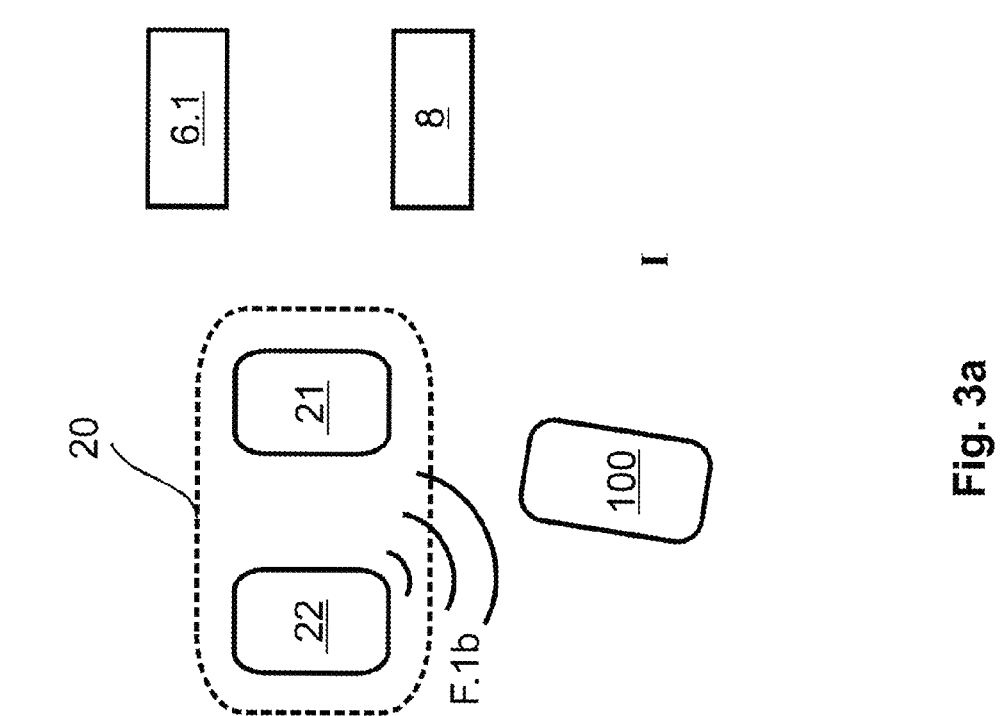

FIGS. 3a and 3b show a further exemplary embodiment of an apparatus 10 according to the invention and a security system according to the invention, wherein a communication device 20 comprises a first communication unit 21 and a second communication unit 22. FIG. 3a also shows a deactivated charging process I, wherein a primary charging unit 8 is not operated and therefore does not inductively transfer electrical energy to a secondary charging unit 6.1. In the case of the inactive charging process I, the communication device 20 is operated by the security system according to the invention of the vehicle 1 in such a manner that, in particular, only a second communication unit 22 is activated. The second communication unit 22 broadcasts a radio signal F at a second radio frequency F.1b, for example, over an LF radio link. If, on the other hand, the primary charging unit 8 is operative and therefore transferring energy by induction to the secondary charging unit 6.1, it is possible for a frequency superposition of a charging frequency L.1 with the LF frequency to occur. Therefore, in the case of the active charging process II the communication device 20 is operated by the security system according to the invention such that a first communication unit 21 is activated and transmits the radio signal F at a radio frequency F.1b which differs from the charging frequency L.1 in such a manner that interference in the communication with the mobile ID transmitter 100 can be prevented.

Figure 4A:
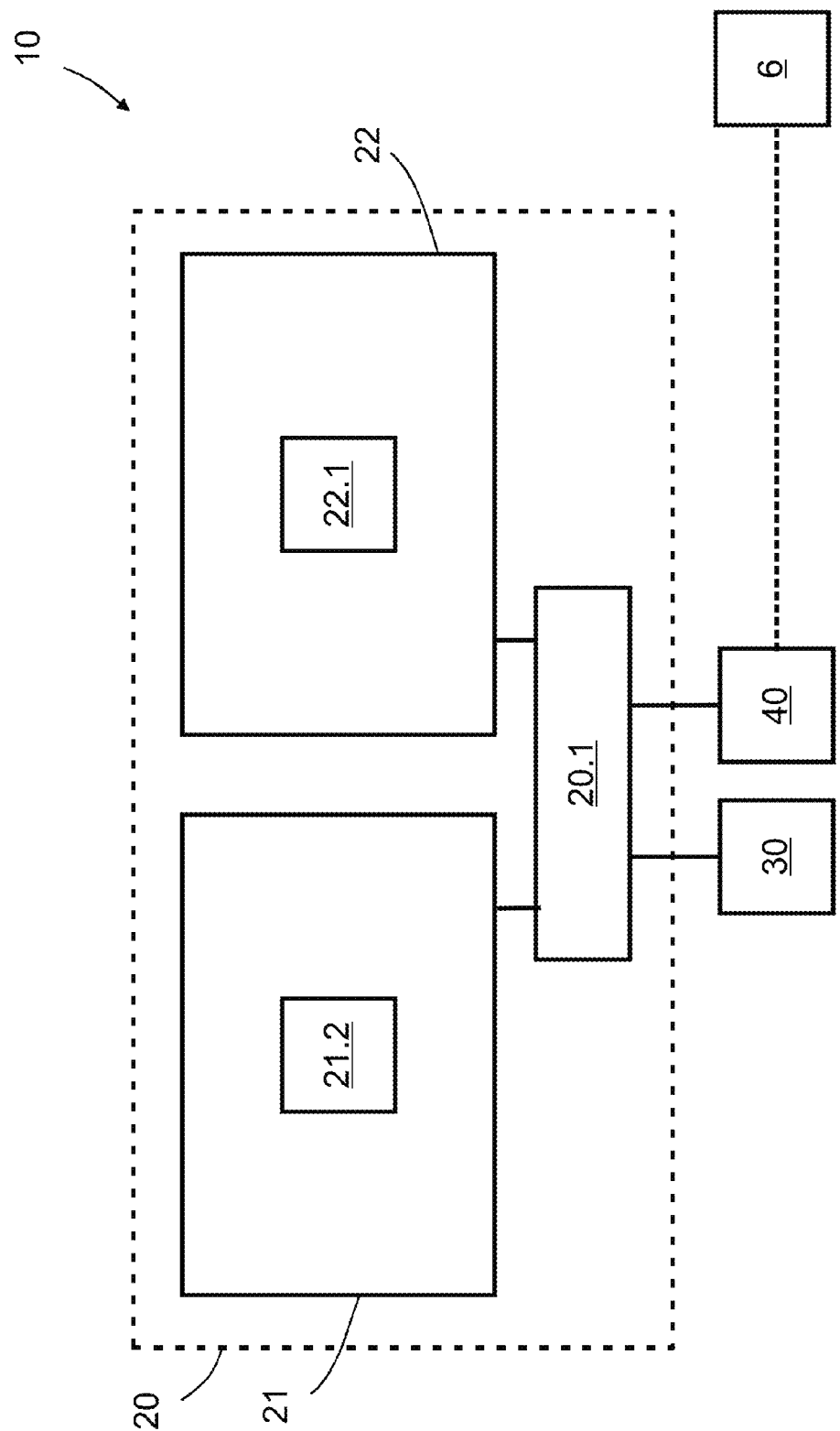
Figure 4B:
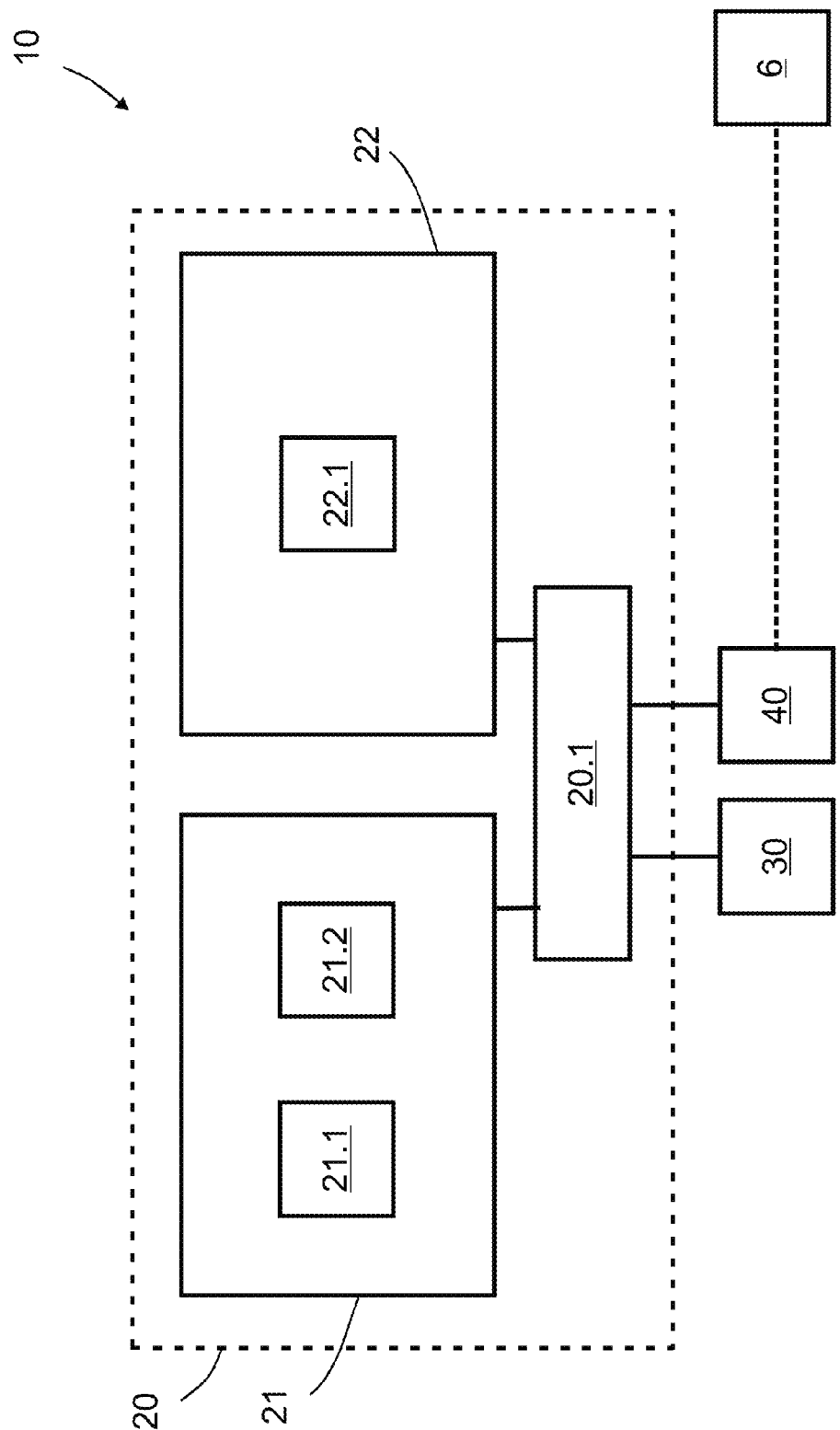

FIG. 4a shows another exemplary embodiment of an apparatus 10 according to the invention, wherein a schematic layout of a communication device 20 is shown. The communication device comprises a first communication unit 21 and a second communication unit 22. It is also conceivable for the communication device 20 to have only the first communication unit 21. The first communication unit 21 can comprise an HF communication interface 21.2 that is suitable for transmitting a radio signal F over an HF radio link to an ID transmitter 100. The radio signal F in this case is transmitted with a radio frequency F.1, which is in the range from 3 MHz to 30 MHz, for example. This radio frequency F.1 therefore differs significantly from a charging frequency L.1 of a charging device 6 of a vehicle 1. So that the first communication unit 21 is activated e.g. exclusively when a charging process II is activated and in the normal case (i.e. when a charging process I is deactivated), in particular, only a second communication unit 22 is activated, which in particular comprises an LF communication interface 22.1 for broadcasting the radio signal F at an LF radio frequency, a control unit 20.1 is provided. The control unit 20.1 comprises, for example, a set of electronics such as an evaluation unit that is capable of receiving and then evaluating electronic signals, and of outputting electronic control signals for controlling the first communication unit 21 and/or the second communication unit 22. The control unit 20.1 is e.g. electronically connected to the first communication unit 21, the second communication unit 22, a sensor device 30 of the vehicle 1 and/or to a monitoring device 40 of the vehicle 1. The sensor device 30 can, for example, inform the control unit 20.1 when an object 4 is approaching the vehicle 1. The control unit 20.1 can then query, for example, the monitoring device 40. This query is used by the control unit 20.1 to determine whether a charging process L is currently activated or deactivated. For this purpose the monitoring device 40 can be connected e.g. electronically and/or wirelessly to a charging device 6 of the vehicle 1. It can also be provided that the monitoring device 40 has sensors for monitoring the charging process L, which can detect e.g. interference signals in the charging frequency range L.2. If, for example, both the sensor device 30 transmits a signal to the control unit 20.1 that an object 4 has been detected, and the monitoring device 40 transmits a signal to the control unit 20.1 that a charging process L is activated, then the control unit 20.1 activates the first communication unit 21, whereupon the radio signal F is transmitted by the first communication unit 21. In the case of a deactivated charging process I by contrast, the control unit 20.1 activates the second communication unit 22. It can also be provided that the first communication unit 21, as is shown in FIG. 4b, also comprises a UWB interface 21.1 and/or a Bluetooth communication interface 21.1 in addition to an HF communication interface 21.2. This allows the reliability of the communication to be increased even further. It is conceivable that, for example, the UWB and/or Bluetooth communication interface 21.1 and the HF communication interface 21.2 simultaneously broadcast the radio signal F, e.g. in order to support different mobile ID transmitters 100. It can also be provided that the UWB and/or Bluetooth communication interface 21.1 and the HF communication interface 21.2 are operated sequentially and/or in a polling mode. Similarly, it may also possible that the monitoring device 40 monitors different frequency ranges (e.g. an LF frequency range and/or a charging frequency range L.2) for interference signals and, depending on the signals detected, either the first communication unit 21, the second communication Unit 22, the UWB and/or the Bluetooth communication interface 21.1 and/or the HF communication interface 21.2 and/or the LF communication interface 22.1 are operated. Of course, the first communication unit 21 and/or the second communication unit can also have additional communication interfaces for additional frequency ranges and transmission technologies (such as NFC, WLAN and the like) which are suitable for transferring the radio signal F over corresponding frequencies.

FIG. 5 shows an exemplary embodiment of a mobile identification transmitter 100 according to the invention (referred to as ID transmitter 100 for short), wherein the design of the mobile ID transmitter 100 is shown schematically. The mobile ID transmitter 100 in this case can comprise at least one sending and/or receiving device 110, which has at least a first sending and/or receiving unit 110.1 and/or a second sending and/or receiving unit 110.2 and/or a third sending and/or receiving unit 110.3. The first and/or third sending and/or receiving unit 110.1 can be suitable for example for communicating with a first communication unit 21 of a communication device 20 of an apparatus 10 according to the invention. The second sending and/or receiving unit 110.2 can accordingly be suitable for communicating with a second communication unit 22 of the communication device 20 of the apparatus 10 according to the invention. The third sending and/or receiving unit 110.3 can also be suitable e.g. for communicating with an HF communication interface 21.2. In order to enable an evaluation of a received radio signal F, an evaluation device 120 is also provided which is connected e.g. electronically to the first sending and/or receiving unit 110.1 and/or the second sending and/or receiving unit 110.2 and/or the third sending and/or receiving unit 110.3.

Figure 6:
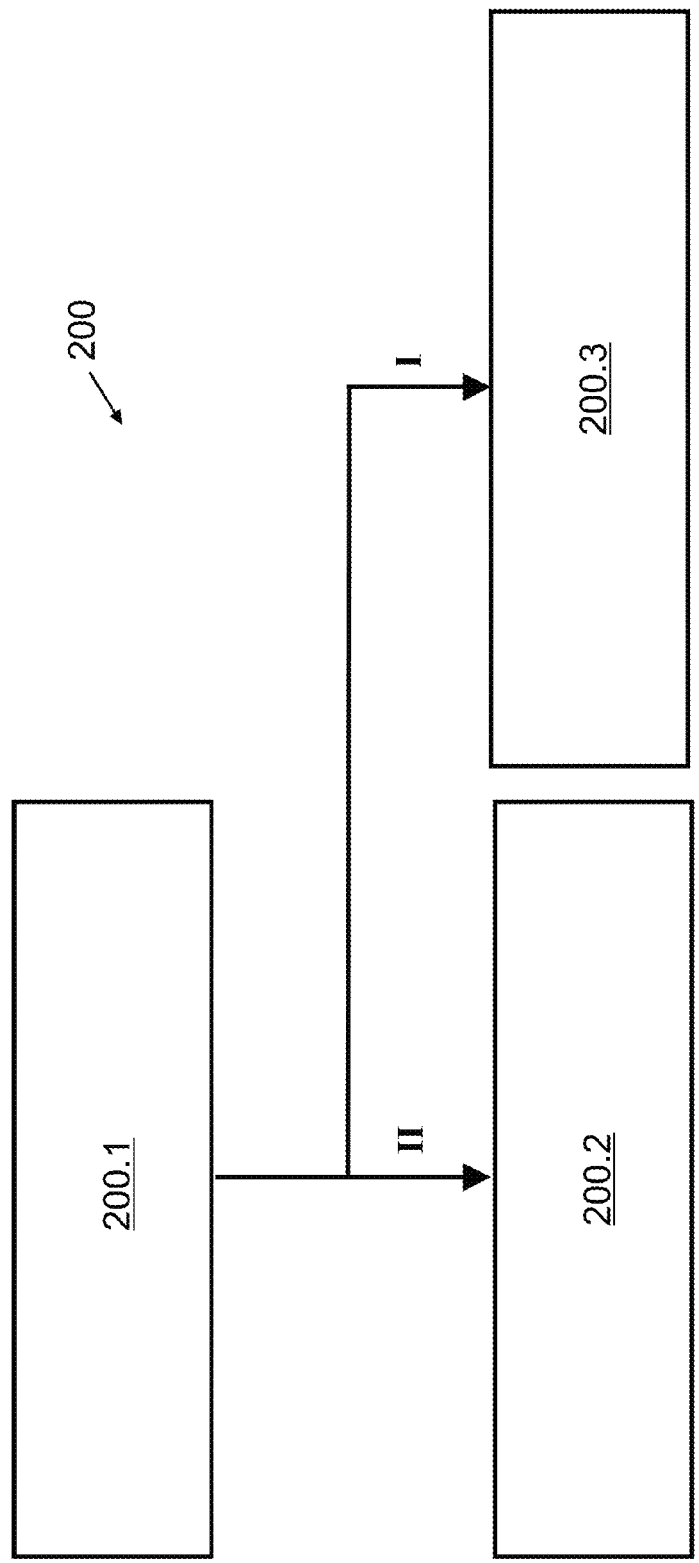

FIG. 6 shows method steps of a method 200 according to the invention in schematic form. In a first method step 200.1 it is evaluated, e. g. by a monitoring device 40, whether a charging process L is activated or deactivated. In the case of an activated charging process II a second method step 200.2 is executed and in the case of a deactivated charging process I a third method step 200.3 is executed. In the second method step 200.2 a first communication unit 21 for transmitting a radio signal F is operated and in the third method step 200.3 a second communication unit 22 for transmitting a radio signal F is operated.

The preceding explanation of embodiments describes the present invention exclusively within the context of examples. Of course, the individual features of the embodiments, where technically feasible, can be freely combined with each other without departing from the scope of the present invention.

LIST OF REFERENCE NUMERALS

1 Vehicle
2 Door handle
4 Object
5 Detection range
6 Charging device
6.1 Secondary charging unit
7 Floor 8 Primary charging unit
10 Apparatus
20 Communication device
20.1 Control unit
21 First communication unit
21.1 Bluetooth communication interface
21.2 HF communication interface
22 Second communication unit
22.1 LF communication interface
30 Sensor device
40 Monitoring device
100 Mobile identification transmitter
110 Sending and/or receiving device
110.1 First sending and/or receiving unit
110.2 Second sending and/or receiving unit
110.3 Third sending and/or receiving unit
120 Evaluation device
200 Method
200.1 First method step
200.2 Second method step
200.3 Third method step
L Charging process
L.1 Charging frequency
L.2 Charging frequency range
F Radio signal
F.1 Radio frequency
F.1a First radio frequency
F.1b Second radio frequency
I Charging process deactivated
II Charging process activated

What is claimed is:

1. An apparatus (10) for a security system of a vehicle (1) for a keyless activation of a locking mechanism of the vehicle (1), having a communication device (20) for communication with a mobile identification transmitter (100) by means of a radio signal (F) with a radio frequency (F.1), wherein an inductive charging process (L) can be carried out in the region of the vehicle (1) with a charging frequency (L.1) for electrically charging an energy storage device, wherein, the radio frequency (F.1) differs from the charging frequency (L.1) such that an interference in the communication with the mobile identification transmitter (100) can be prevented; wherein the communication device (20) can be used to control a first communication unit (21) or a second communication unit (22) for transmitting the radio signal (F), in dependence on the charging process (L).

2. The apparatus (10) according to claim 1, wherein the first communication unit (21) is configured for transmitting the radio signal (F) with a first radio frequency (F.1a), in particular clearly outside of a charging frequency range (L.2); wherein the second communication unit (22) is configured for transmitting the radio signal (F) with a second radio frequency (F.1b), in particular within the charging frequency range (L.2).

3. The apparatus (10) according to claim 1, wherein, a monitoring device (40) is provided for monitoring the charging process (L), wherein the monitoring device (40) can detect an activated and/or deactivated charging process (L).

4. The apparatus (10) according to claim 1, wherein the first communication unit (21) having an ultra-wideband communication interface (21.1) and/or a Bluetooth communication interface (21.1) and/or an HF communication interface (21.2); wherein the second communication unit (22) having an LF communication interface (22.1).

5. The apparatus (10) according to claim 1, wherein the radio frequency (F.1), in particular a first radio frequency (F.1a), differs significantly from the charging frequency (L.1) and in particular is a frequency that is at least 10 times, 100 times and/or 1000 times higher than the charging frequency (L.1).

6. The apparatus (10) according to claim 1, wherein the radio frequency (F.1), in particular a first radio frequency (F.1a), lies in the frequency range from 200 KHz to 10 GHz, in particular in the frequency range from 3 MHz to 3 GHZ and/or the charging frequency (L.1) lies in the charging frequency range (L.2) from 1 KHz to 500kHz, in particular 50KHz to 200kHz.

7. An apparatus (10) for a security system of a vehicle (1) for a keyless activation of a locking mechanism of the vehicle (1), having a communication device (20) for communication with a mobile identification transmitter (100) by means of a radio signal (F) with a radio frequency (F.1), wherein an inductive charging process (L) can be carried out in the region of the vehicle (1) with a charging frequency (L.1) for electrically charging an energy storage device, wherein, the radio frequency (F.1) differs from the charging frequency (L.1) such that an interference in the communication with the mobile identification transmitter (100) can be prevented;
  wherein a sensor device (30) is provided for detecting the proximity of an object (4),in particular of an operator of the mobile identification transmitter (100), wherein in particular in the event of a positive detection of the proximity and of an activated charging process (L), the first communication on unit (21) can be controlled by the communication device (20).

8. A mobile identification transmitter (100) for connecting to an apparatus (10) for a security system of a vehicle (1) for a keyless activation of a locking mechanism of the vehicle (1),
  wherein the apparatus (10) has a communication device (20) for communication with the mobile identification transmitter (100) by means of a radio signal (F) with a radio frequency (F.1),
  wherein an inductive charging process (L) can be carried out in the region of the vehicle (1) with a charging frequency (L.1) for electrically charging an energy storage device, wherein, the radio frequency (F.1) differs from the charging frequency (L.1) such that an interference in the communication with the mobile identification transmitter (100) can be prevented;
  wherein the communication device (20) can be used to control a first communication unit (21) or a second communication unit (22) for transmitting the radio signal (F), in dependence on the charging process (L).

9. The mobile identification transmitter (100) according to claim 8, wherein the mobile identification transmitter (100) can be operated with an apparatus (10) having a communication device (20) for communication with the mobile identification transmitter (100) by means of the radio signal (F) with the radio frequency (F.1).

10. A method (200) for operating an apparatus (10) for a security system of a vehicle (1) for keyless activation of a locking mechanism of the vehicle (1),
  wherein the apparatus (10) has a communication device (20) for communication with a mobile identification transmitter (100) by means of a radio frequency signal (F) with a radio frequency (F.1),
  wherein an inductive charging process (L) can be carried out in the region of the vehicle (1) with a charging frequency (L.1) for electrically charging an energy storage device, wherein the radio frequency (F.1) differs from the charging frequency (L.1) such that an interference in the communication with the mobile identification transmitter (100) is prevented;

wherein the communication device (20) can be used to control a first communication unit (21) second communication unit (22)for transmitting the radio signal (F), in dependence on the charging process (L).

11. The method (200) according to claim 10, wherein the radio signal (F) is a wake-up signal to be received the mobile identification transmitter (100), wherein on receiving the wake-up signal the mobile identification transmitter (100) transmits a response signal to the apparatus (10).

12. The method (200) according to claim 10, wherein a charging device (6) of the vehicle (1) is operated during an active charging process (L), wherein in particular, due to a current flowing in a primary charging unit (8), a voltage is generated in a secondary charging unit (6.1) of the charging device (6) for charging up a rechargeable battery of the vehicle (1).

13. The method (200) according to claim 10, wherein the following steps are carried out for a contactless authentication with the security system of the vehicle (1):
 a) transmission of the radio signal (F) by the communication device (20),
 b) reception of the radio signal (F) by the mobile identification transmitter (100),
 c) transmission of a response signal, in particular with a security code, to the communication device (20).

14. The method (200) according to claim 10, wherein a device (10) for communication with a mobile identification transmitter (100) by means of a radio signal (F) with a radio frequency (F.1) is used,
 wherein an inductive charging process (L) can be carried out in the region of the vehicle (1) with a charging frequency (L.1) for electrically charging an energy storage device wherein, the radio frequency (F.1) differs from the charging frequency (L.1) such that an interference in the communication with the mobile identification transmitter (100) can be prevented.

15. A security system, in particular a passive access system for a vehicle (1), having a mobile identification transmitter (100) and an apparatus (10), wherein the apparatus (10) has a communication device (20) for communication with the mobile identification transmitter (100) by means of a radio frequency signal (F) with a radio frequency (F.1), wherein an inductive charging process (L) can be carried out in the region of the vehicle (1) with a charging frequency (L.1) for electrically charging an energy storage device, wherein the radio frequency (F.1) differs from the charging frequency (L.1) such that an interference in the communication with the mobile identification transmitter (100) can be prevented;

wherein the communication device (20) can be used to control a first communication unit (21) or a second communication unit (22) transmitting the radio signal (F), in dependence on the charging process (L).

16. The security system according to claim 15, wherein the security system can be operated according to a method (200) wherein the following steps are carried out for a contactless authentication with the security system of the vehicle (1):
 (a) transmission of the radio signal (F) by the communication device (20),
 b) reception of the radio signal (F) by the mobile identification transmitter (100),
 c) transmission of a response signal, in particular with a security code, to the communication device (20).

17. A vehicle (1), in particular an electric vehicle (1), having an apparatus (10) for a security system of the vehicle (1) for a keyless activation of a locking mechanism of the vehicle (1), wherein the apparatus (10) has a communication device (20) for communication with a mobile identification transmitter (100) by means of a radio frequency signal (F) with a radio frequency (F.1), wherein an inductive charging process (L) can be carried out in the region of the vehicle (1) with a charging frequency (L.1) for electrically charging an energy storage device, wherein the radio frequency (F.1) differs from the charging frequency (L.1) such that an interference in the communication with the mobile identification transmitter (100) can be prevented;
 wherein the communication device (20) can be used to control a first communication unit (21) or a second communication unit (22) for transmitting the radio signal (f), in dependence on the charging process (L).

18. The vehicle (1) according to claim 17, wherein a charging device (6) is provided for carrying out the inductive charging process (L) of the vehicle (1) with the charging frequency (L.1), wherein the charging device (6) in particular has a secondary charging unit (6.1), and energy can be transferred by induction from a primary charging unit (8) in particular during the charging process (L).

19. The vehicle (1) according to claim 17, wherein the vehicle (1) can be operated according to a method (200) wherein the following steps are carried out for a contactless authentication with the security system of the vehicle (1);
 a) transmission of the radio signal (F) by the communication device (20),
 b) reception of the radio signal (F) by the mobile identification transmitter (100),
 c) transmission of a response signal, in particular with a security code, to the communication device (20).

\* \* \* \* \*